(12) United States Patent
Thomson

(10) Patent No.: US 7,999,730 B2
(45) Date of Patent: Aug. 16, 2011

(54) SYSTEM AND METHOD FOR PROVIDING GNSS ASSISTANT DATA WITHOUT DEDICATED RECEIVERS

(75) Inventor: Martin Thomson, Keiraville (AU)

(73) Assignee: Andrew, LLC, Hickory, NC (US)

( * ) Notice: Subject to any disclaimer, the term of this patent is extended or adjusted under 35 U.S.C. 154(b) by 206 days.

(21) Appl. No.: 12/314,164

(22) Filed: Dec. 5, 2008

(65) Prior Publication Data

US 2010/0141516 A1 Jun. 10, 2010

(51) Int. Cl.
*G01S 19/05* (2010.01)
(52) U.S. Cl. .................................................. 342/357.42
(58) Field of Classification Search ............... 455/456.2, 455/415, 357.42
See application file for complete search history.

(56) References Cited

U.S. PATENT DOCUMENTS

| 6,295,023 | B1 | 9/2001 | Bloebaum |
| 6,532,251 | B1 | 3/2003 | King et al. |
| 6,703,972 | B2 | 3/2004 | van Diggelen |
| 2003/0187575 | A1 | 10/2003 | King et al. |
| 2006/0046749 | A1 | 3/2006 | Pomerantz et al. |
| 2008/0074317 | A1 | 3/2008 | Harper et al. |
| 2008/0106463 | A1 | 5/2008 | van Diggelen et al. |
| 2008/0183384 | A1 | 7/2008 | Gaal et al. |
| 2008/0254810 | A1* | 10/2008 | Fok et al. ................... 455/456.2 |
| 2009/0181658 | A1* | 7/2009 | Snapp ........................... 455/415 |

FOREIGN PATENT DOCUMENTS

EP 1 203 965 8/2002

* cited by examiner

*Primary Examiner* — Harry Liu
(74) *Attorney, Agent, or Firm* — Duane Morris, LLP

(57) ABSTRACT

A system and method of providing satellite assistance data to a mobile device without using a reference network. A request may be transmitted to a plurality of mobile device requesting that ones of the devices transmit a portion of a navigation data message received from one or more satellites to a location determining system. Navigation data message portions may be recorded and transmitted from the ones of the plural mobile devices to the location determining system. These navigation data message portions may then be compiled by the location determining system, and assistance data provided to a mobile device as a function of the compiled navigation data message portions.

26 Claims, 7 Drawing Sheets

FIG. 3
PRIOR ART

SYSTEM AND METHOD FOR PROVIDING GNSS ASSISTANT DATA WITHOUT DEDICATED RECEIVERS

BACKGROUND

Radio communication systems generally provide two-way voice and data communication between remote locations. Examples of such systems are cellular and personal communication system ("PCS") radio systems, trunked radio systems, dispatch radio networks, and global mobile personal communication systems ("GMPCS") such as satellite-based systems. Communication in these systems is conducted according to a pre-defined standard. Mobile devices or stations, also known as handsets, portables or radiotelephones, conform to the system standard to communicate with one or more fixed base stations. It is important to determine the location of such a device capable of radio communication especially in an emergency situation. In addition, in 2001 the United States Federal Communications Commission ("FCC") required that cellular handsets must be geographically locatable. This capability is desirable for emergency systems such as Enhanced 911 ("E-911"). The FCC requires stringent accuracy and availability performance objectives and demands that cellular handsets be locatable within 100 meters 67% of the time for network based solutions and within 50 meters 67% of the time for handset based solutions.

Current generations of radio communication generally possess limited mobile device location determination capability. In one technique, the position of the mobile device is determined by monitoring mobile device transmissions at several base stations. From time of arrival or comparable measurements, the mobile device's position may be calculated. However, the precision of this technique may be limited and, at times, may be insufficient to meet FCC requirements. In another technique, a mobile device may be equipped with a receiver suitable for use with a Global Navigation Satellite System ("GNSS") such as the Global Positioning System ("GPS"). GPS is a radio positioning system providing subscribers with highly accurate position, velocity, and time ("PVT") information.

FIG. 1 is a schematic representation of a constellation 100 of GPS satellites 101. With reference to FIG. 1, GPS may include a constellation of GPS satellites 101 in non-geosynchronous orbits around the earth. The GPS satellites 101 travel in six orbital planes 102 with four of the GPS satellites 101 in each plane. Of course, a multitude of on-orbit spare satellites may also exist. Each orbital plane has an inclination of 55 degrees relative to the equator. In addition, each orbital plane has an altitude of approximately 20,200 km (10,900 miles). The time required to travel the entire orbit is just under 12 hours. Thus, at any given location on the surface of the earth with clear view of the sky, at least five GPS satellites are generally visible at any given time.

With GPS, signals from the satellites arrive at a GPS receiver and are conventionally utilized to determine the position of the receiver. GPS position determination is made based on the time of arrival ("TOA") of various satellite signals. Each of the orbiting GPS satellites 101 broadcasts spread spectrum microwave signals encoded with satellite ephemeris information and other information that allows a position to be calculated by the receiver. Presently, two types of GPS measurements corresponding to each correlator channel with a locked GPS satellite signal are available for GPS receivers. The two carrier signals, L1 and L2, possess frequencies of 1.5754 GHz and 1.2276 GHz, or wavelengths of 0.1903 m and 0.2442 m, respectively. The L1 frequency carries the navigation data as well as the standard positioning code, while the L2 frequency carries the P code and is used for precision positioning code for military applications. The signals are modulated using bi-phase shift keying techniques. The signals are broadcast at precisely known times and at precisely known intervals and each signal is encoded with its precise transmission time. There is also an L2C signal being transmitted by several satellites. The LC2C signal is a second civilian frequency transmitted by GPS satellites. L1 transmits the Coarse Acquisition ("C/A") code. L2C transmits L2CM (civil-moderate) and L2CL (civil long) codes. These codes allow a device to differentiate between satellites that are all transmitting on the same frequency. The C/A code is 1 milliseconds long, the L2CM is 20 milliseconds long and the L2CL is 1.5 seconds long. The L2C codes provide a more robust cross-correlation performance so that reception of weak GPS signals is less affected by simultaneously received strong GPS signals. The civil navigation message ("CNAV") is the broadcast model that can be transmitted on the L2C and provides a more accurate and frequent message than the legacy navigation message.

GPS receivers measure and analyze signals from the satellites, and estimate the corresponding coordinates of the receiver position, as well as the instantaneous receiver clock bias. GPS receivers may also measure the velocity of the receiver. The quality of these estimates depends upon the number and the geometry of satellites in view, measurement error and residual biases. Residual biases generally include satellite ephemeris bias, satellite and receiver clock errors, and ionospheric and tropospheric delays. If receiver clocks were perfectly synchronized with the satellite clocks, only three range measurements would be needed to allow a user to compute a three-dimensional position. This process is known as multilateration. However, given the engineering difficulties and the expense of providing a receiver clock whose time is exactly synchronized, conventional systems generally account for the amount by which the receiver clock time differs from the satellite clock time when computing a receiver's position. This clock bias is determined by computing a measurement from a fourth satellite using a processor in the receiver that correlates the ranges measured from each satellite. This process requires four or more satellites from which four or more measurements can be obtained to estimate four unknowns x, y, z, b. The unknowns are latitude, longitude, altitude and receiver clock offset. The amount b, by which the processor has added or subtracted time, is the instantaneous bias between the receiver clock and the satellite clock. It is possible to calculate a location with only three satellites when additional information is available. For example, if the altitude of the handset or mobile device is well known, then an arbitrary satellite measurement may be included that is centered at the center of the earth and possesses a range defined as the distance from the center of the earth to the known altitude of the handset or mobile device. The altitude of the handset may be known from another sensor or from information from the cell location in the case where the handset is in a cellular network.

Downloading broadcasted ephemeris information from one or more of the satellites is slow (i.e., no faster than 18 seconds given that a respective GPS satellite-navigation message is 900 bits in length and broadcast in a 50 bps data stream). When in environments in which GPS signals possess low signal strengths, downloading ephemeris information is frequently difficult and sometimes impossible. Responsive to these obstacles, some prior and current GPS implementations make use of a terrestrial wireless or wired communication medium for transmitting ephemeris information to a GPS These GPS implementations are commonly known as "Assisted-GPS" or, simply, A-GPS and/or A-GNSS.

A-GPS has gained significant popularity recently in light of stringent time to first fix ("TTFF"), i.e., first position determination and sensitivity, requirements of the FCC E-911 regulations. In A-GPS, a communications network and associated infrastructure may be utilized to assist the mobile GPS receiver, either as a standalone device or integrated with a mobile station or device. The general concept of A-GPS is to establish a GPS reference network (and/or a wide-area D-GPS network or a wide area reference network ("WARN")) including receivers with clear views of the sky that may operate continuously. This reference network may also be connected with the cellular infrastructure, may continuously monitor the real-time constellation status, and may provide data for each satellite at a particular epoch time. For example, the reference network may provide ephemeris information, UTC model information, ionosphere model information, and other broadcast information to the cellular infrastructure. A typical embodiment of a WARN includes a reference station network comprising a plurality of tracking stations coupled to one another through a communications network. The reference stations are generally deployed over a wide area and contain GPS receivers so that ephemeris may be collected from all satellites within a global network of satellites. The network may also include a central processing site that collects the ephemeris information from the tracking stations.

Typical A-GPS information may include data for determining a GPS receiver's approximate position, time synchronization mark, satellite ephemerides, various model information and satellite dopplers. Different A-GPS services may omit some of these parameters; however, another component of the supplied information is the identification of the satellites for which a device or GPS receiver should search. From such assistance data, a mobile device will attempt to search for and acquire satellite signals for the satellites included in the assistance data. If, however, satellites are included in the assistance data that are not measurable by the mobile device (e.g., the satellite is no longer visible, etc.), then the mobile device will waste time and considerable power attempting to acquire measurements for the satellite.

When acquiring GNSS measurements for A-GNSS positioning, conventional devices do not utilize information available in the navigation data message provided by satellite signals. Autonomous GNSS devices rely upon the navigation data message to determine necessary parameters for a position determination. For GNSS systems such as GPS and Galileo, the navigation data message is modulated on a satellite signal at a low data rate ensuring that the information in the message does not interfere with a wireless device's ability to detect the signal. Unfortunately, the navigation data message is modulated on the coarse acquisition signal at a rate of 50 bps. GPS uses 1500 bits in each frame, and thus it takes 30 seconds to receive an entire frame, much longer than the typical time allowed for A-GNSS positioning.

An A-GNSS server may provide a service including the transmission of the navigation data message to a wireless device over more efficient terrestrial networks. This assistance data may be provided to reduce the time required to go from satellite signal acquisition to the calculation of a position and may also enable more sensitivity because the modulation of the navigation data message may be compensated. An A-GNSS server may also provide a service performing the calculations necessary to determine location information. A wireless device may take measurements of plural satellite signals and return these measurements to the A-GNSS server. Because the device makes basic measurements, the device does not require all of the information from the navigation data message. This may be useful to lower network utilization, and the A-GNSS server may utilize other measurement sources that would be otherwise inadequate, and the respective processing load may be moved to a more economic and efficient server, rather than a mobile device having scarce processing resources.

Typical operation of an A-GNSS server requires a wide area reference network consisting of geographically distributed GNSS receivers at fixed locations. These GNSS receivers provide the A-GNSS server with the current navigation data message from each satellite. There is, however, a need for a method and system for providing GNSS assistance data without dedicated receivers that would overcome the deficiencies of the prior art. Therefore, an embodiment of the present subject matter provides a method for providing satellite assistance data to a mobile device without using a reference network. The method may comprise sending information to a plurality of mobile devices, the information including a request that ones of the plural mobile devices transmit a portion of a navigation data message received from one or more satellites to a location determining system. Navigation data message portions transmitted from the ones of the plural mobile devices may be collected and compiled by the location determining system. Assistance data may then be provided to a mobile device as a function of the compiled navigation data message portions.

Another embodiment of the present subject matter provides a method for providing satellite assistance data to a mobile device. The method may comprise receiving a location request from the mobile device at a location determining system and providing assistance data to the mobile device in response to the location request without information from a satellite reference network.

A further embodiment of the present subject matter may provide a method for providing satellite assistance data to a mobile device. The method may comprise receiving a location request from the mobile device at a location determining system and providing assistance data to the mobile device in response to the location request as a function of compiled navigation data message bits received from a plurality of mobile devices.

One embodiment of the present subject matter provides a system for providing satellite assistance data to a mobile device without using a reference network. The system may include a transmitter for transmitting information to a plurality of mobile devices, the information including a request that ones of the plural mobile devices provide a portion of a navigation data message received from one or more satellites to a location determining system. The system may also include a receiver for receiving navigation data message portions transmitted from ones of the plurality of mobile devices, and circuitry for compiling the received navigation data message portions. The transmitter may then transmits assistance data to one or more mobile devices as a function of the compiled navigation data message.

Another embodiment of the present subject matter provides a method for providing satellite assistance data to a mobile device. The method may comprise receiving a location request from the mobile device at a location determining system, and providing assistance data to the mobile device in response to the location request as a function of compiled navigation data message bits received from a plurality of mobile devices and navigation data message bits received from a satellite reference network.

A further embodiment of the present subject matter may generate a database of signals received from a plurality of mobile devices to provide satellite assistance data to ones of the devices. The method may comprising transmitting information to a plurality of mobile devices, the information including a request that ones of the plural mobile devices transmit a portion of a navigation data message received from one or more satellites to a location determining system. The navigation data message portions transmitted from the ones of the plural mobile devices may be collected and assembled by the location determining system to create a substantially complete navigation data message.

These embodiments and many other objects and advantages thereof will be readily apparent to one skilled in the art to which the invention pertains from a perusal of the claims, the appended drawings, and the following detailed description of the embodiments.

BRIEF DESCRIPTION OF THE DRAWINGS

FIG. 3 is an illustration of the structure of a GPS hand over word.

DETAILED DESCRIPTION

Figure 1:
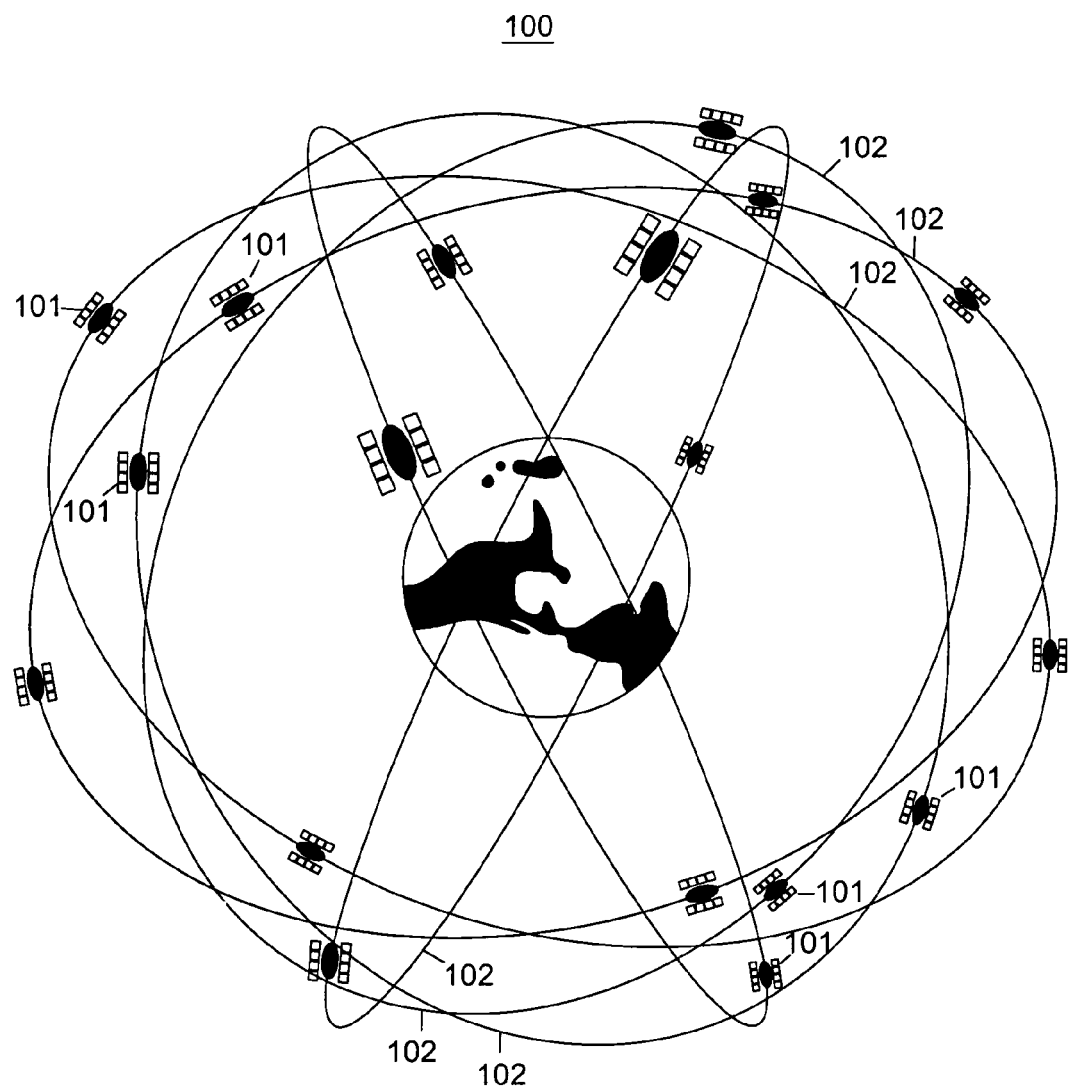
FIG. 1 is a schematic representation of a constellation of GPS satellites.

With reference to the figures where like elements have been given like numerical designations to facilitate an understanding of the present subject matter, the various embodiments of a system and method for providing GNSS assistance data without dedicated receivers are herein described.

The disclosure relates to a mobile appliance or device and a location determining system using satellite signals and/or measurements of these satellite signals. Exemplary devices may include, but are not limited to, a cellular device, text messaging device, computer, portable computer, vehicle locating device, vehicle security device, communication device, and wireless transceiver. The satellites may be considered as part of a Global Navigation Satellite System ("GNSS"), such as, but not limited to, the U.S. Global Positioning System ("GPS"). While the following description references the GPS system, this in no way should be interpreted as limiting the scope of the claims appended herewith. As is known to those of skill in the art, other GNSS systems operate, for the purposes of this disclosure, similarly to GPS, such as, but not limited to, the European Satellite project, Galileo; the Russian satellite navigation system, GLONASS; the Japanese Quasi-Zenith Satellite System ("QZSS"), and the Chinese satellite navigation and positioning system called Beidou (or Compass). Therefore, references in the disclosure to GPS and/or GNSS, where applicable, as known to those of skill in the art, apply to the above-listed GNSS systems as well as other GNSS systems not listed above.

Generally wireless A-GPS devices or handsets have a low time to first fix ("TTFF") as the devices are supplied with assistance data from an exemplary communications network to assist in locking onto or acquiring satellites quickly. Exemplary A-GPS devices may include, but are not limited to, a cellular device, text messaging device, computer, portable computer, vehicle locating device, vehicle security device, communication device, and wireless transceiver. These devices may provide satellite measurements back to a location determining system to perform a position calculation. Exemplary network elements that supply the assistance data and/or perform the position calculation may be a location determining system such as a Mobile Location Center ("MLC"), location information server or system ("LIS"), or other comparable network element. The location determining system may generally be a node in a wireless network that performs the location of a mobile device. The location determining system generally requires a wireless device to provide true and accurate measurements to determine an accurate location or provide accurate assistance data. The integrity of the resulting location is important because the location may be used by emergency services operators to find an injured person, for location-based services, etc.

When acquiring GNSS measurements for A-GNSS positioning, conventional devices do not utilize information available in the navigation data message provided by satellite signals. For example, the GPS navigation data message is modulated on the coarse acquisition signal at a rate of 50 bps. GPS uses 1500 bits in each frame, and thus it takes 30 seconds to receive the entire frame, much longer than the typical time allowed for A-GNSS positioning.

Figure 2:
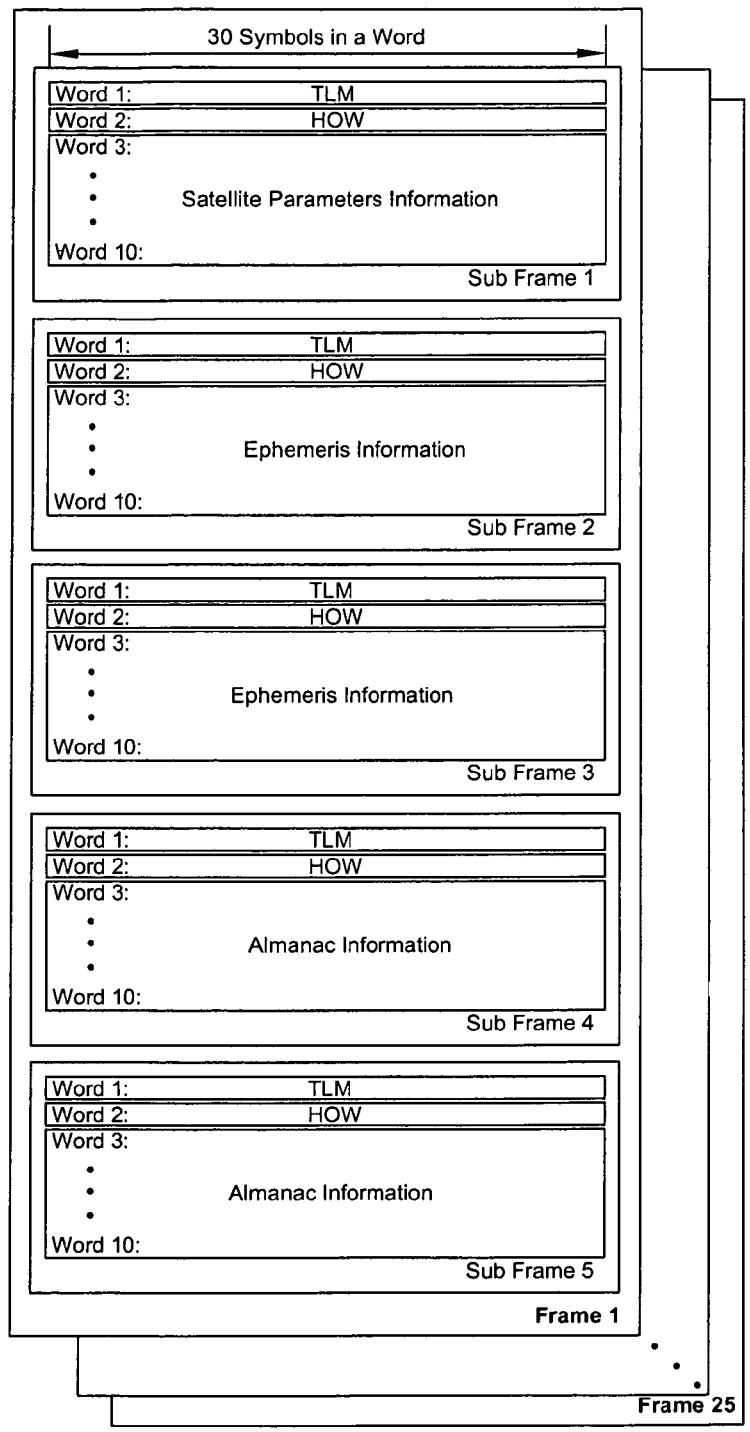
FIG. 2 is an illustration of the structure of a GPS navigation data message.

FIG. 2 is an illustration of the structure of a GPS navigation data message. With reference to FIG. 2, one complete navigation data message of a GPS satellite consists of 25 frames and has a duration of 750 seconds (12.5 minutes). One frame is transmitted for 30 seconds and includes 5 sub-frames. Each sub-frame has 10 words, and each word contains 30 binary symbols (bits), among those there are six parity bits. A symbol has duration of 20 ms; therefore, a complete navigation data message includes 37,500 symbols.

Each sub-frame comprises a telemetry ("TLM") word and a hand-over word ("HOW") which are transmitted first. The first seventeen bits of the HOW contain a value representative of the time of the week ("TOW"), as measured from midnight Saturday, UTC time for GPS. The next eight words, referred to as words 3-10, provide the clock, ephemeris, and almanac data. Specifically, the first sub-frame includes satellite clock parameters and other satellite information. The second and third sub-frames include ephemeris data, and the fourth and fifth sub-frames include almanac data. Ephemeris data is changed once every 1 to 6 hours, and is usually changed once every two hours. Data within the first, second, and third sub-frames repeats in every frame (and thus repeats every 30 seconds). A complete Almanac is distributed among the 25 frames in sub-frames 4 and 5 thereof, and one must read through all 25 frames to obtain a complete Almanac. Accordingly, a complete Almanac repeats once every 750 seconds.

Figure 3:
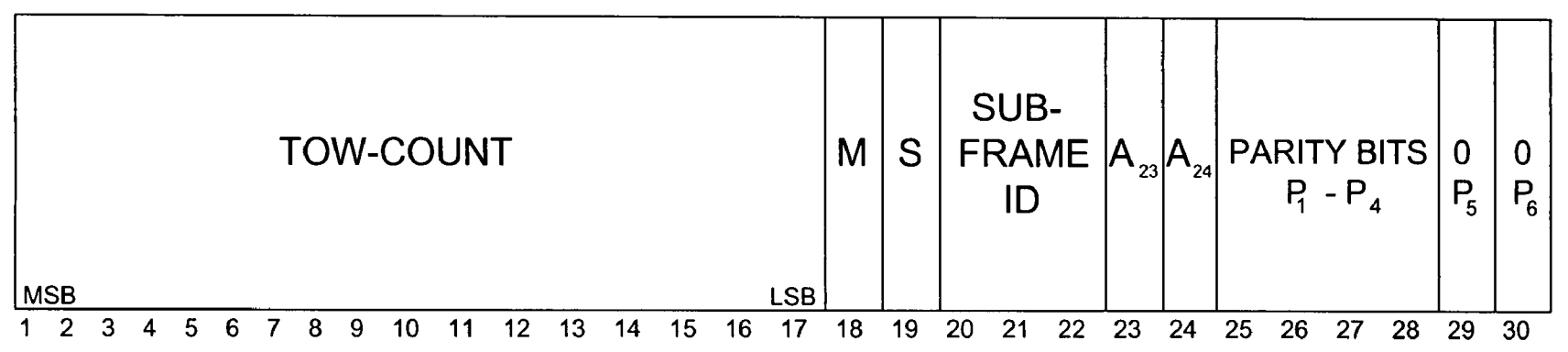

The major portion of information in the navigation data message is repetitive: ephemeris data repeats every 30 seconds, and almanac data repeats every 750 seconds. The TLM word from each satellite is also repetitive and may be determined by a priori knowledge. The TOW value transmitted in each HOW does not repeat. For example, the TOW value increases by one unit every sub-frame, starting from the beginning of the week. FIG. 3 is an illustration of the structure of a GPS HOW. The first seventeen bits hold the TOW count, which is incremented in value by one each sub-frame. The next two bits M and S, which are the eighteenth and nineteenth bits, hold flags which represent the current state of the momentum flag and the synchronization flag, respectively.

The next three bits (20-22) contain an integer identifier for the sub-frame. The bits have the following values for sub-frames 1-5, respectively: (0, 0, 1), (0, 1, 0), (0, 1, 1), (1, 0, 0), and (1, 0, 1). The next two bits (23-24) are the last two bits of the previous word. The last six bits of the HOW are parity bits.

Typical operation of a location determining system such as an A-GNSS server generally requires a wide area reference network consisting of geographically distributed GNSS receivers at fixed locations. These GNSS receivers provide the A-GNSS server with the current navigation data message from each satellite. In contrast to this conventional means, however, an A-GNSS server according to an embodiment of the present subject matter may provide a service including the transmission of the navigation data message to a mobile device without use of a wide area reference network. This assistance data may be provided to reduce the time required to go from satellite signal acquisition to the calculation of a position of the device and may also enable a greater degree of sensitivity because the modulation of the navigation data message may be compensated. An exemplary A-GNSS server may also perform any necessary calculations to determine location information. A wireless device may take measurements of the satellite signals and return these measurement results to the A-GNSS server. Because the wireless device makes basic measurements, the device would not require all of the information from the navigation data message. One aspect of such an embodiment of the present subject matter would be to lower network utilization. A further aspect of embodiments of the present subject matter may allow an exemplary A-GNSS server to utilize other measurement sources for location or other purposes that would be otherwise inadequate. Yet another aspect of embodiments of the present subject matter is the transfer of processing loads to a more economic and efficient server, rather than to a mobile device where processing resources are scarce.

When measuring GNSS signals using A-GNSS, it is not necessary for an exemplary wireless device to receive and interpret the navigation data message. The wireless device, however, may still measure and record any number of bits of the navigation data message received. Because signals from plural satellites may be acquired at different times, the wireless device may measure and record navigation data bits from earlier satellites while the device searches for signals from other satellites.

In one embodiment, an exemplary A-GNSS server may request that a wireless device provide a predetermined number of bits from the navigation data message. Any portion or multiple portions of the navigation data message shown in FIGS. 2 and 3 and described above may be requested by the A-GNSS server. These portions may then be returned by the wireless device to the A-GNSS server after the device measures the respective GNSS signals. The A-GNSS server may collect navigation data bits from a plurality of wireless devices as each device makes a request. Of course, the A-GNSS server may collect navigation data bits from a plurality of wireless devices during any communication with the devices, and such an example should not limit the scope of the claims appended herewith. In another embodiment, the server may request of a wireless device that the device provide multiple sets of GNSS measurements, and hence navigation data bits, over time. These navigation data bits may then be collected between subsequent GNSS measurements adding no delay or cost to the wireless device. The navigation data bits may then be correlated and assembled by the A-GNSS server to reveal the complete navigation data message. As a function of this information, the A-GNSS server may transmit assistance data to any number of wireless devices. Therefore, embodiments of the present subject matter may obviate the need for a satellite reference network.

The overall impact to an individual wireless device may be minimized as a function of the number of devices in a respective wireless network. For example, the more devices that provide navigation data bits, the fewer the number of bits required of each device. Therefore, embodiments of the present subject matter may be well suited for large networks having a large number of wireless devices; however, such an example should not limit the scope of the claims appended herewith. Embodiments of the present subject matter provide little, if any, impact to a respective wireless device, especially if the device provides navigation data bits collected during performance of signal acquisition.

In one embodiment, the A-GNSS server may be primed with sufficient information to generate assistance data for its first location request. This may be accomplished by requesting a predetermined number of handsets conduct autonomous GNSS positioning or by distributing a predetermined number of captive handsets throughout a coverage area to provide navigation message bits as required. In yet another embodiment of the present subject matter, the A-GNSS server may utilize an exemplary reference network to acquire navigation data message information applicable to one or more geographic areas in combination with information being retrieved from plural wireless devices to thereby increase the amount of assistance data that the server may provide. For example, a reference network of GNSS receivers may be available to an exemplary system that provides the necessary information. The reference network may include a plurality of geographically dispersed reference stations. These stations may be fixed reference stations and/or mobile reference stations. An exemplary reference network may be, but is not limited to, a wide area reference network ("WARN"). Exemplary information may be, but is not limited to, ephemeris information, almanac information, ionosphere model information, UTC model information, and combinations thereof. Upon receipt of the appropriate measurement data, the location determining system calculates a navigation data message in combination with navigation data message bits or portions received from plural wireless devices.

Figure 4:
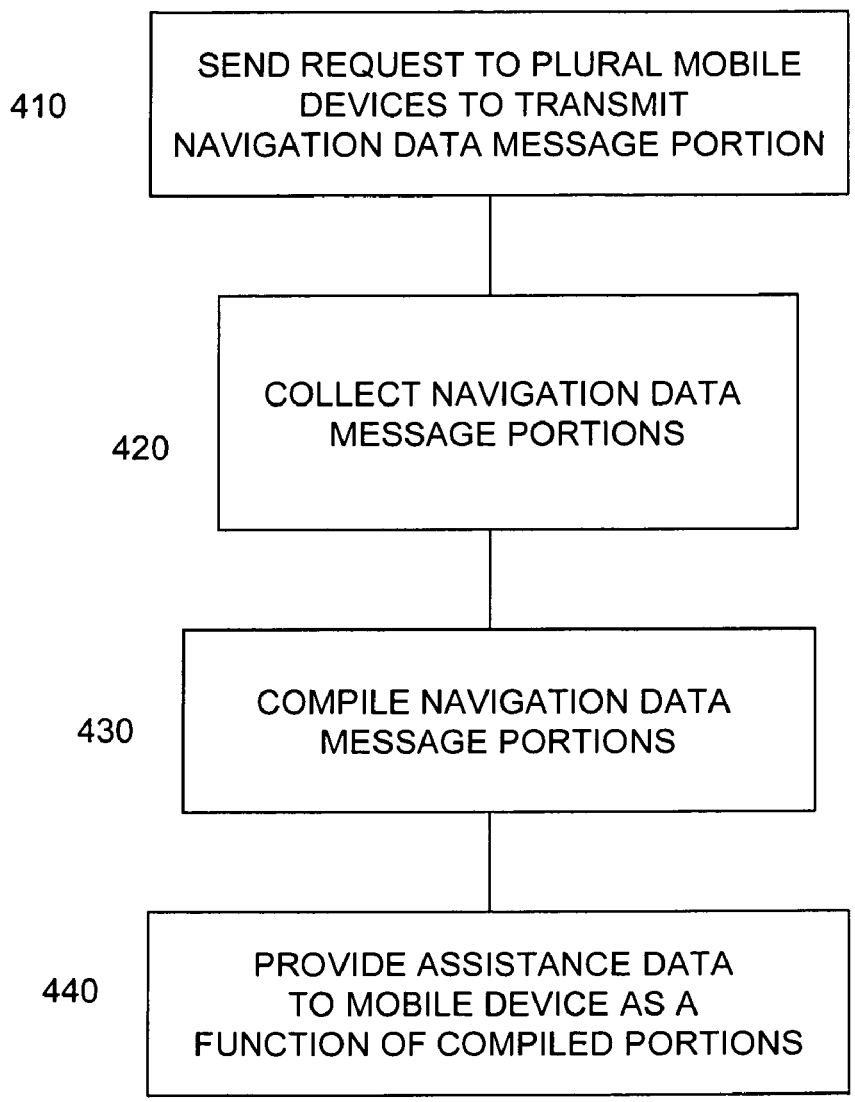
FIG. 4 is an algorithm according to one embodiment of the present subject matter.

FIG. 4 is an algorithm according to one embodiment of the present subject matter. With reference to FIG. 4, a method 400 of providing satellite assistance data to a mobile device without using a reference network is provided. At step 410, information may be sent to a plurality of mobile devices, the information including a request that ones of the plural mobile devices transmit a portion of a navigation data message received from one or more satellites to a location determining system. An exemplary location determining system may be an MLC or LIS. At step 420, navigation data message portions transmitted from the ones of the plural mobile devices may be collected, and at step 430, these collected navigation data message portions compiled, predicted, assembled, reconstructed, and/or correlated by the location determining system. In one embodiment, the navigation data message portions may be collected as each device transmits a location request to the location determining system. These navigation data message portions may comprise a predetermined number of bits and may be any portion of the navigation data message. Assistance data may then be provided to a mobile device as a function of the compiled navigation data message portions at step 440. In another embodiment, a location of the mobile device may be estimated as a function of the assistance data. In a further embodiment the step of compiling may further comprise combining the collected navigation data message portions with navigation data message portions provided by an exemplary reference network such as, but not limited to, a WARN.

One embodiment of the present subject matter may generate a database of signals received from a plurality of mobile devices to provide satellite assistance data to ones of the devices. This exemplary method may transmit information to a plurality of mobile devices, the information including a request that ones of the plural mobile devices transmit a portion of a navigation data message received from one or more satellites to a location determining system. The navigation data message portions transmitted from the ones of the plural mobile devices may be collected and assembled by the location determining system to create a substantially complete navigation data message. These navigation data message portions may be a predetermined number of bits. Assistance data may then be provided to a mobile device as a function of the assembled navigation data message portions. The step of assembling may also comprise combining the collected navigation data message portions with navigation data message portions provided by a reference network, such as but not limited to, a WARN.

Figure 5:
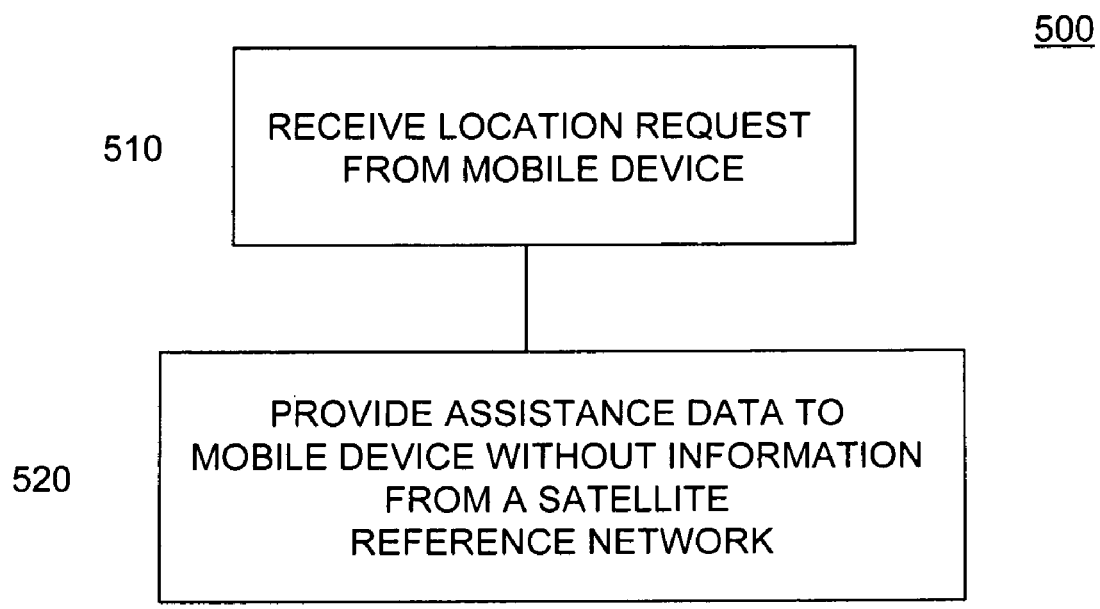
FIG. 5 is an algorithm according to another embodiment of the present subject matter.

FIG. 5 is an algorithm according to another embodiment of the present subject matter. With reference to FIG. 5, a method 500 is provided for transmitting satellite assistance data to a mobile device. At step 510, a location request may be received from the mobile device at a location determining system, and at step 520, assistance data may be provided to the mobile device in response to the location request without information from a satellite reference network. While not shown, an additional embodiment of the present subject matter may provide assistance data the mobile device in response to the location request as a function of compiled navigation data message bits received from a plurality of mobile devices and information received from a reference network.

Figure 6:
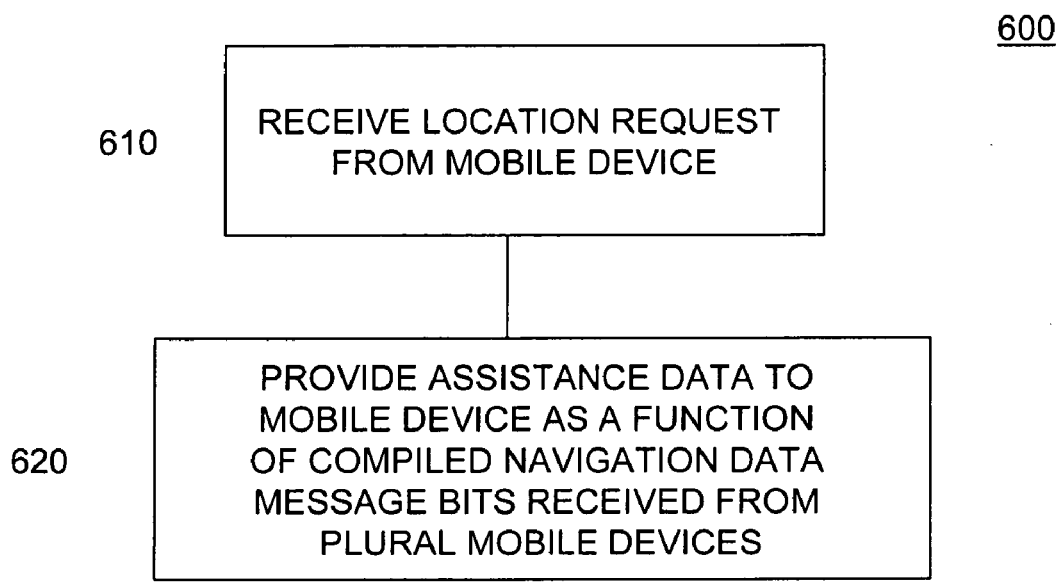
FIG. 6 is an algorithm according to a further embodiment of the present subject matter.

FIG. 6 is an algorithm according to a further embodiment of the present subject matter. With reference to FIG. 6, a method 600 is provided for transmitting satellite assistance data to a mobile device. At step 610, a location request may be received from the mobile device at a location determining system, and at step 620, assistance data may be provided to the mobile device in response to the location request as a function of compiled navigation data message bits received from a plurality of mobile devices. Of course, the compiled navigation data message bits, in one embodiment, may include bits received from a reference network.

Figure 7:
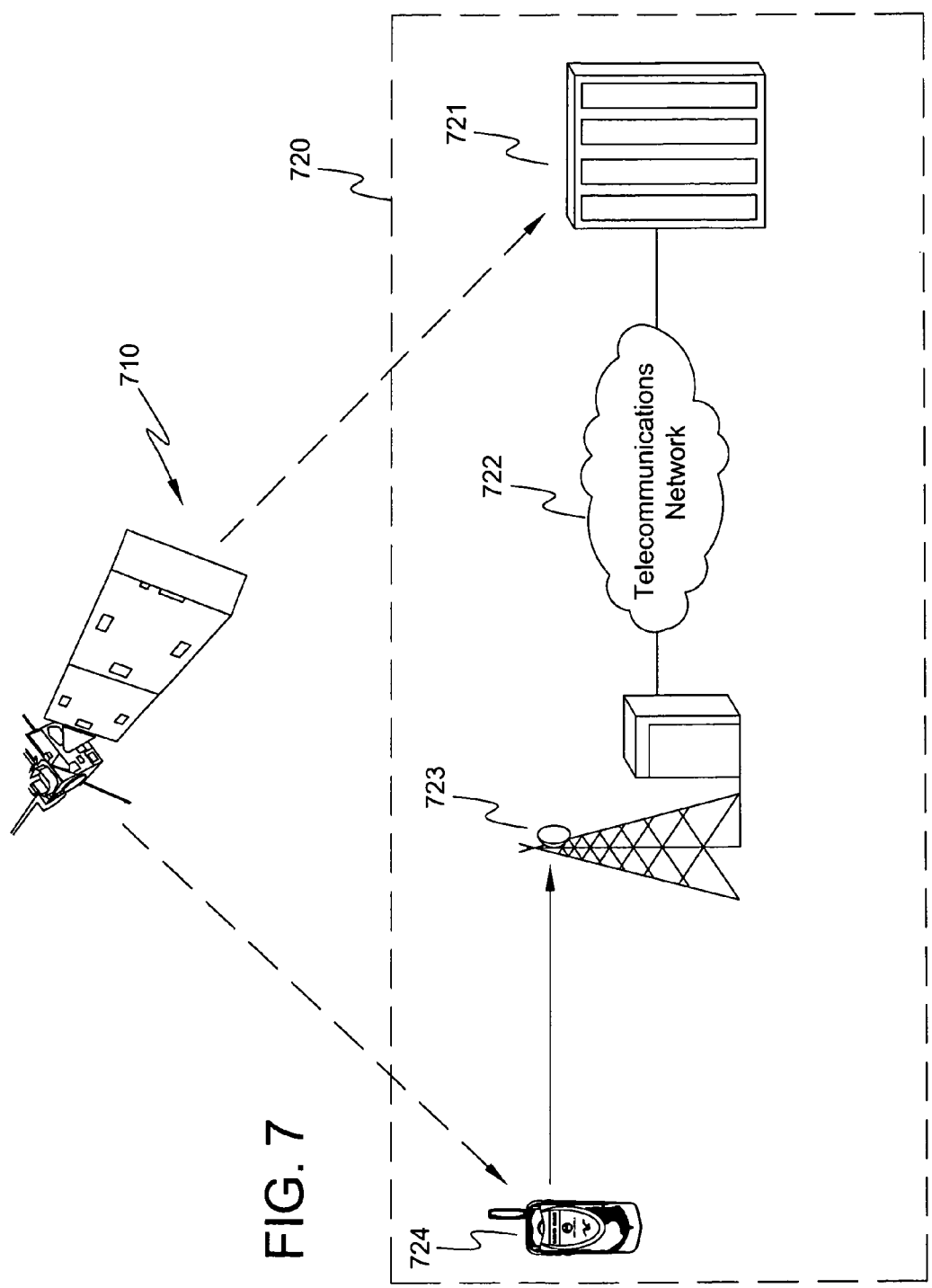
FIG. 7 is a schematic representation for implementing one embodiment of the present subject matter.

FIG. 7 is a schematic representation for implementing one embodiment of the present subject matter. With reference to FIG. 7, a satellite system 710 may communicate with a terrestrial system 720. An exemplary satellite system 710 may be a GNSS such as, but not limited to, a GPS, Galileo system, GLONASS system, QZSS, Compass system, Bediou system, etc. The ground system 720 may include a cellular network having a location center 721 and may receive information from or include a SBAS, WAAS, EGNOS, digital television network, and combinations thereof. The location center 721 may be an MLC, LIS or other network component such as a central office configured to communicate with a telecommunications network 722 and/or at least one base station 723. In a further embodiment, the location center 721 may include a transmitter for transmitting to the mobile device 724 acquisition assistance data, a location request, and other information. In one embodiment, the request may include information requiring the device 724 to provide a portion of a navigation data message from one or more satellites. The location center 721 may include a receiver for receiving signals transmitted from a mobile device 724, and circuitry for determining the location of the mobile device 724 as a function of received signals from the device 724. The location center 721 may also include circuitry for collecting, determining, predicting, assembling, reconstructing and otherwise compiling a navigation data message as a function of received navigation data message portions from one or more devices 724. The transmitter may then transmit assistance data to the device 724 as a function of the compiled navigation data message. Exemplary devices 724 may be, but are not limited to, a cellular device, text messaging device, computer, portable computer, vehicle locating device, vehicle security device, communication device, or wireless transceiver.

In one embodiment, the location center 721 may also include a database having information from a reference network such as a WARN. Exemplary reference networks may include a plurality of geographically dispersed reference stations and may include fixed reference stations, mobile reference stations, or combinations thereof. In an alternative embodiment, the location center 721 may include circuitry for determining the navigation data message as a function of information from the reference network.

As shown by the various configurations and embodiments illustrated in FIGS. 1-7, a method and system for providing GNSS assistance data without dedicated receivers have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method of providing satellite assistance data to a mobile device, comprising the steps of:
   (a) sending information to a plurality of mobile devices, the information including a request that ones of the plural mobile devices transmit a portion of a navigation data message received from one or more satellites to a location determining system;
   (b) collecting navigation data message portions transmitted from the ones of the plural mobile devices;
   (c) compiling the collected navigation data message portions by the location determining system; and
   (d) providing assistance data to a mobile device as a function of the compiled navigation data message portions.

2. The method of claim 1 wherein the step of collecting further comprises collecting the portions from ones of the plurality of mobile devices as each device transmits a location request to the location determining system.

3. The method of claim 1 wherein the navigation data message portions comprise a predetermined number of bits.

4. The method of claim 1 wherein the step of compiling is selected from the group consisting of predicting, assembling, reconstructing, correlating, and combinations thereof.

5. The method of claim 1 wherein the location determining system is a mobile location center ("MLC") or a location information server ("LIS").

6. The method of claim 1 wherein the satellites are part of a Global Navigation Satellite System ("GNSS").

7. The method of claim 6 wherein the GNSS is selected from the group consisting of: a Global Positioning System ("GPS"), Galileo system, GLONASS system, Quasi-Zenith Satellite System ("QZSS"), Compass satellite system, Bediou satellite system, and combinations thereof.

8. The method of claim 1 wherein the mobile device is selected from the group consisting of: cellular device, text messaging device, computer, portable computer, vehicle locating device, vehicle security device, communication device, and wireless transceiver.

9. The method of claim 1 further comprising the step of estimating a location of the mobile device as a function of the assistance data.

10. The method of claim 1 wherein the step of compiling further comprises combining the collected navigation data message portions with navigation data message portions provided by a reference network.

11. The method of claim 10 wherein the reference network is a wide area reference network ("WARN").

12. In a method for providing satellite assistance data to a mobile device, the method comprising receiving a location request from the mobile device at a location determining system, the improvement comprising providing assistance data to the mobile device in response to the location request as a function of compiled navigation data message bits received from a plurality of mobile devices.

13. The method of claim 12 wherein the complied navigation data message bits include bits received from a reference network.

14. A system for providing satellite assistance data to a mobile device, comprising:
- (a) a transmitter for transmitting information to a plurality of mobile devices, the information including a request that ones of the plural mobile devices provide a portion of a navigation data message received from one or more satellites to a location determining system;
- (b) a receiver for receiving navigation data message portions transmitted from ones of the plurality of mobile devices; and
- (c) circuitry for compiling the received navigation data message portions;
- wherein said transmitter transmits assistance data to one or more mobile devices as a function of the compiled navigation data message.

15. The system of claim 14 wherein the navigation data message portions comprise a predetermined number of bits.

16. The system of claim 14 wherein the satellites are part of a Global Navigation Satellite System ("GNSS").

17. The system of claim 16 wherein the GNSS is selected from the group consisting of: a Global Positioning System ("GPS"), Galileo system, GLONASS system, Quasi-Zenith Satellite System ("QZSS"), Compass satellite system, Bediou satellite system, and combinations thereof.

18. The system of claim 14 wherein the mobile device is selected from the group consisting of: cellular device, text messaging device, computer, portable computer, vehicle locating device, vehicle security device, communication device, and wireless transceiver.

19. The system of claim 14 further comprising circuitry for determining the navigation data message as a function of information from a reference network.

20. The system of claim 19 wherein the reference network is a wide area reference network ("WARN").

21. In a method for providing satellite assistance data to a mobile device, the method comprising receiving a location request from the mobile device at a location determining system, the improvement comprising providing assistance data to the mobile device in response to the location request as a function of compiled navigation data message bits received from a plurality of mobile devices and navigation data message bits received from a satellite reference network.

22. A method of generating a database of signals received from a plurality of mobile devices to provide satellite assistance data to mobile devices in a communications network, comprising the steps of:
- (a) sending information to a plurality of mobile devices, the information including a request that ones of the plural mobile devices transmit a portion of a navigation data message received from one or more satellites to a location determining system;
- (b) collecting navigation data message portions transmitted from the ones of the plural mobile devices; and
- (c) assembling the collected navigation data message portions by the location determining system to create a substantially complete navigation data message.

23. The method of claim 22 further comprising the step of:
- (d) providing assistance data to one or more mobile devices as a function of the assembled navigation data message portions.

24. The method of claim 22 wherein the navigation data message portions comprise a predetermined number of bits.

25. The method of claim 22 wherein the step of assembling further comprises combining the collected navigation data message portions with navigation data message portions provided by a reference network.

26. The method of claim 25 wherein the reference network is a wide area reference network ("WARN").

* * * * *